United States Patent [19]

Firman

[11] Patent Number: 4,733,470

[45] Date of Patent: Mar. 29, 1988

[54] MOUNTING APPARATUS

[76] Inventor: Henry J. Firman, 15 Apsley Way, Longthorpe, Petersborough, PE3 6NE, Cambridgeshire, Great Britain

[21] Appl. No.: 918,780

[22] Filed: Oct. 14, 1986

[30] Foreign Application Priority Data

Oct. 17, 1985 [GB] United Kingdom ................. 8525572

[51] Int. Cl.⁴ ............................................. B26B 13/00
[52] U.S. Cl. .................................... 30/231; 30/296 R
[58] Field of Search ................. 30/296 R, 296 A, 231, 30/272 A, 228, 198, 210

[56] References Cited

U.S. PATENT DOCUMENTS 2,750,666  6/1956  Teagle ............................... 30/231 X
4,207,675  6/1980  Causey et al. ..................... 30/296 R Primary Examiner—Douglas D. Watts

[57] ABSTRACT

Mounting apparatus 10 for use with commercial electric hedge trimming apparatus 12 comprises a hand-held support frame 14 to support the hedge trimmer at one end 18. The hedge trimmer is angularly adjustable in direction A about an axis 19 to vary the angle of cut. Mounting means 20 for the hedge trimmer provides both for said angular adjustment of the trimmer and for releasably securing it to the apparatus whereby the hand tool 22 may be detached for subsequent direct hand operation by a user.

7 Claims, 4 Drawing Figures

MOUNTING APPARATUS

This invention relates to mounting apparatus for use with hedge and the like cutting apparatus. For example, the mounting apparatus is particularly applicable for use with electrically powered hedge trimmers of the hand tool kind. The invention is also applicable for use with other hand tools employing cutting apparatus such as electrically powered saws having reciprocating blades of the jig saw kind and indeed to similar tools powered by other means such as pneumatic pressure. An example of the application of the mounting apparatus of the present invention is to provide equipment in the form of cutting apparatus suitable for trimming hedges, shrubs, small trees and the like.

Many householders favour the provision of relatively high hedges, shrubs and flowering trees around their property for reasons of privacy and related factors. Nevertheless, such hedges and the like impose maintenance requirements which can be burdensome. For example, the trimming of such hedges often involves the use of step ladders, trestles and the like. These can be difficult and dangerous to use due to the problems of maintaining the balance of the operator and due also to such problems as the legs of the step ladder or other support sinking into soft ground. Moreover, these operations can be time consuming and frustrating. In addition, it often happens that the growth of spurs and small branches results in thickened stems which are beyond the cutting capabilities of conventional hedge trimmers.

A further factor is that even if a hedge trimmer is obtained which has a relatively long cutter bar, although this may be able to reach relatively high portions of the hedge, it is heavy and the job is exhausting and time consuming.

In G.B. No. 718,819 (Teagle) there is disclosed a portable power-operated machine for use in the cutting or trimming of hedges, grass, weeds, crops and other vegetable or arboreal growth, and in hoeing, cultivating and like agricultural operations. The machine comprises support arm means adapted to be carried by a user to support drivable cutting means at one end thereof. The cutting means is angularly adjustable with respect to the support arm means. However, the machine of this prior specification incorporates its own internal combustion engine mounted at the opposite end of the support arm means from the cutting means and is thus relatively heavy to carry and correspondingly expensive to produce. Moreover, it is of no particular utility for that large body of people who already possess an electrically-powered hedge trimmer of the hand tool kind.

I have thus identified a considerable need for improvements in the means for trimming hedges, particularly tall hedges, shrubs, small trees and the like. It is an object of the present invention to provide mounting apparatus offering improvements in relation to one or more of the factors discussed above, or generally. Moreover, the method and apparatus disclosed herein may have application somewhat beyond the particular field of hedge and the like trimming.

According to the invention there is provided mounting apparatus for use with hedge and the like cutting apparatus as defined in the accompanying claims. The invention also provides mounting apparatus not limited by all features of the claims hereof, but comprising any novel combination of features disclosed herein.

In an embodiment described below mounting apparatus for use with hedge and the like cutting apparatus comprises means whereby the cutting apparatus is removably mounted in the region of one end of support arm means for use beyond the reach of the user's arms. By virtue of the angularly adjustable mounting of the cutting means, the latter can be used for trimming both the sides and the top region of a hedge or the like. A series of angularly spaced apertures formed in mounting means for the cutting means, and adapted to receive a connection bolt or pin or the like, defines corresponding working positions of the cutting means with respect to the suppport arm means. For example, these positions may be suitable for providing a horizontal top surface of the hedge and a 45 degree chamfer at each side. In the embodiment, releasable securing means enables the cutting means to be quickly attached and detached from the mounting means therefor. The support arm means comprises a pair of spaced arms arranged to be held by the user in two-handed fashion and forming a rigid or semi-rigid support frame.

The support arm means is provided with connection means for connection to a harness or other support worn by the user. Preferably, the connection means includes means for quickly attaching and detaching same. The harness may comprise a strapped waist harness and/or a shoulder harness.

Embodiments of the invention will now be described by way of example with reference to the accompanying drawings in which.

Figure 1:
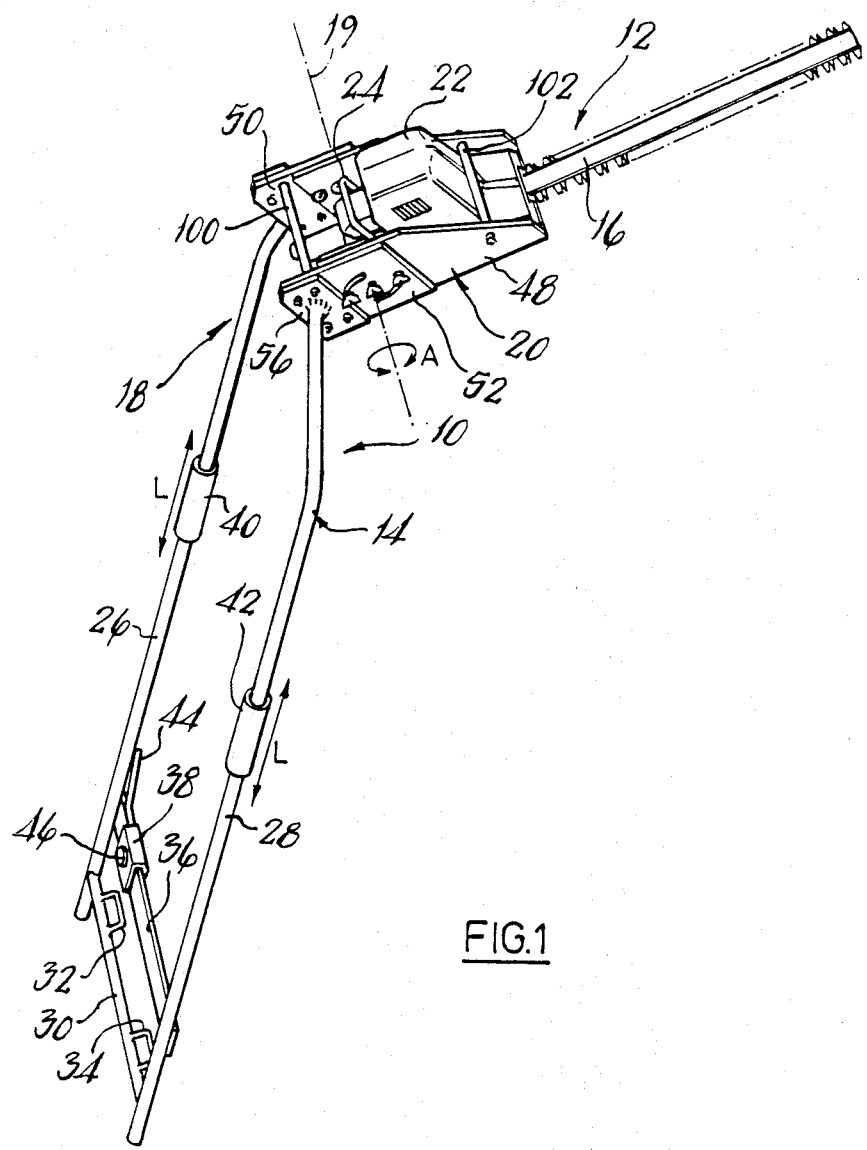
FIG. 1 shows mounting apparatus with an electric hedge trimmer mounted thereon, the perspective being slightly adjusted for purposes of illustration.

As shown in the drawings, mounting apparatus 10 for use with hedge and the like cutting apparatus 12 comprises support arm means 14 adapted to be carried by a user to support drivable cutting means 16 at one end 18 thereof. The cutting means is angularly adjustable in the direction indicated by arrow A about an axis 19, with respect to the support arm means 14. Mounting means 20 is provided at the end 18 of the support arm means to receive and support the cutting means 16 which is in the form of an electrically powered cutter bar-type hedge trimmer. The mounting means 20 provides the angular adjustment A of the cutter bar 16 with respect to the support arm 14 to vary the angle of cut of the cutter bar. Releasable securing means 24 is provided to releasably secure the hedge trimmer 22 to the mounting means 20 whereby the hedge trimmer may be detached for subsequent direct hand operation by a user.

Support arm means 14 comprises a frame having side arms 26, 28 to be grasped by a user. A cross stay 30 has harness-receiving hoops 32, 34 and a cross bar 36 forms a mounting for a control switch 38. Side arms 26, 28 are length-adjustable in the direction L by virtue of the upper portion thereof being slidingly and telescopically received in the lower portion thereof, there being provided screw-threaded adjustment sleeves 40, 42, one for each side arm. The adjuster sleeves are rotatable about the lengthwise axis of each side arm and acting through a tapered end portion of the lower outer portion of each side arm, the tapered portion being formed into fingers for gripping the inner portion of the side arm, the adjuster members permit telescopic length adjustment of the side arms and fixing of same at any desired adjusted length.

Switch 38 is in the form of an on/off switch connected in the electricity supply cable to trimmer 22. The supply cable is not shown in the drawing. It may be routed along the side arms of frame 14. The switch is biased to its off condition and has a generally L-shaped switch actuator element 44 positioned for finger control by a user holding the side arms 26, 28. The switch includes lock means to lock the switch actuator element 44 in its off condition. The lock means is releasable by a release element 46 in the form of a button positioned separately from switch actuator 44 whereby actuation of the switch to its on condition by the actuator element 44 requires also simultaneous actuation of the release element 46.

Cutting means 16 is in the form of a conventional cutter bar having a central longitudinal fixed bar having laterally projecting shear teeth and a longitudinally extending reciprocatable bar having corresponding laterally projecting shear teeth to co-operate with the fixed teeth in a shearing action. The reciprocatable bar is driven by an electric motor in the housing of trimmer 22 in a conventional manner.

Figure 2:
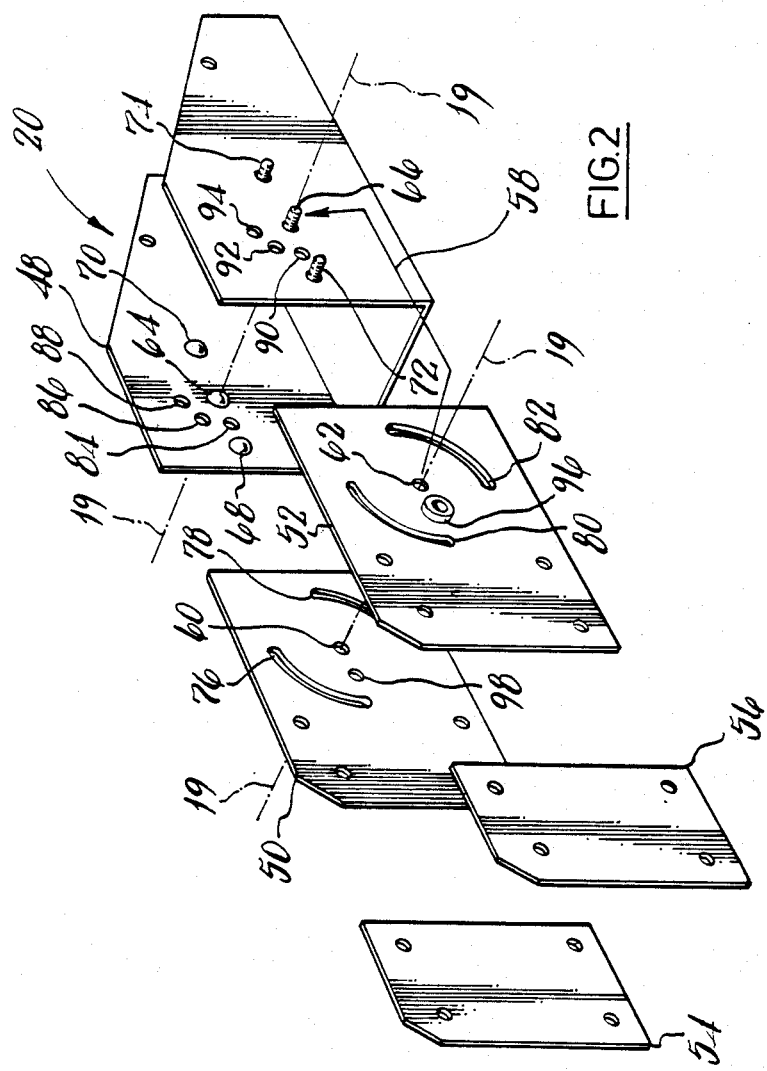
FIG. 2 shows an exploded perspective view of the main components of mounting means for the hedge trimmer of FIG. 1.

Mounting means 20 will now be described in more detail with reference to FIGS. 2, 3 and 4. As shown in FIG. 2, mounting means 20 comprises a generally U-section pivoting mounting member 48 adapted to be mounted for pivotable movement about axis 19 in a pair of fixed outer side plates 50, 52 which are themselves bolted to a pair of frame end plates 54, 56 welded to the ends of side arms 26, 28.

Fixed plates 54 and 56 are simply bolted to plates 50, 52 as shown in FIG. 1. Plates 50 and 52 are received on the outer side of mounting member 48. As indicated by assembly arrow 58, central pivot apertures 60, 62 formed in plates 50, 52 are received on central threaded pivot studs 64, 66 projecting from member 48 to define the pivot axis 19. Corresponding studs 68, 70 and 72, 74 provided on each side of studs 64, 66, are received in aligned arcuate slots 76, 78 and 80, 82 formed in plates 50, 52 respectively.

Adjustment apertures 84, 86, 88 and 90, 92, 94 are formed in mounting member 48 to receive respective adjustment bolts 110, 112 which are screw-threadedly received in mounting collars 96 and associated apertures 98 provided on and formed in plates 50, 52. The adjustment apertures 84 to 94 are arranged at 45 degree intervals around axis 19 and positioned to receive the adjustment bolts when screwed into collars 96, so as to define working positions of the apparatus, at 45 degree intervals about axis 19. FIG. 4 shows the position for cutting the top of a hedge horizontally. From that position, the apparatus is adjustable anti-clockwise as seen in FIG. 4 about axis 19 to a 45 degree position for producing a 45 degree chamfer along the top side edge of the hedge. The third position is reached by adjustment through a further 45 degrees in the anti-clockwise direction to reach the cutter postion for trimming the vertical side face of the hedge. In all three positions, the support arm means 14 is held in the position shown in FIG. 4 at an included angle of approximately 135 degrees with respect to the cutter bar 16.

Figure 3:
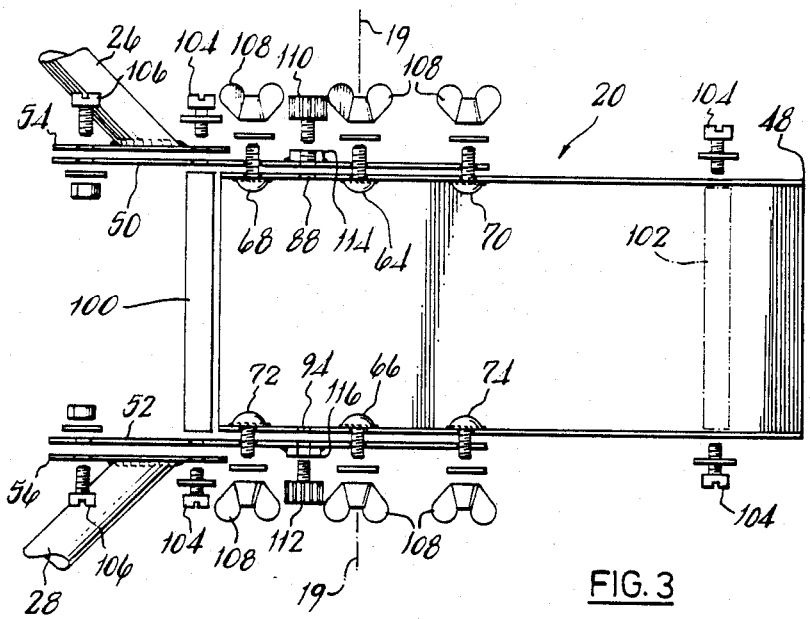
FIG. 3 shows a plan view of the mounting means for the hedge trimmer of FIG. 1.

FIG. 3 shows further details of the mounting means 20 including stiffeners 100, 102 which are threaded to receive bolts 104. Also shown are the fixing bolts 106 securing plates 54, 56 to fixed plates 50, 52. Each of the studs 64 to 74 has a corresponding adjustment wing nut 108 and an associated washer. Likewise, FIG. 3 shows the threaded adjustment bolts 110, 112 which screw-threadedly engage collars 114, 116 welded to fixed plates 50, 52 and which enter the aligned apertures 84, 86 or 88 and 90, 92 or 94 respectively. It will be understood that this arrangement provides three pre-set adjusted attitudes for the cutting apparatus. Alternatively, the apparatus may be adjusted and fixed at any intermediate position by simply not using the threaded adjusters 110, 112 and simply setting the cutting apparatus at a desired attitude by use of the wing nuts 108.

Figure 4:
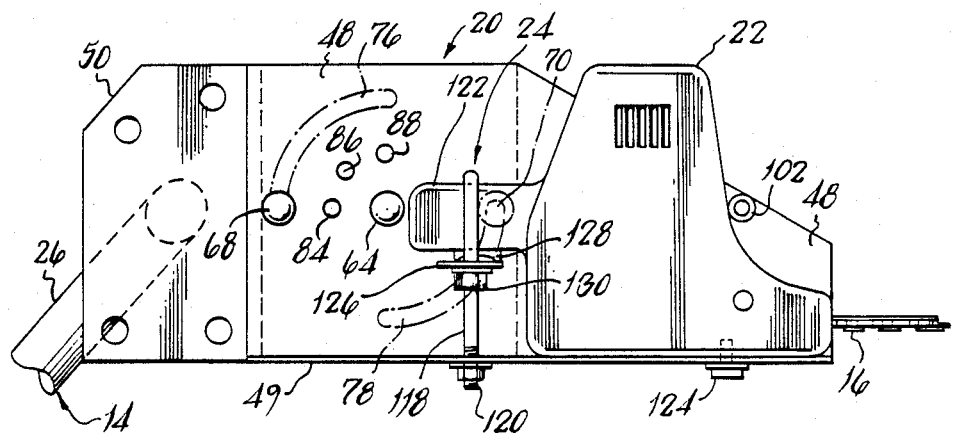
FIG. 4 shows a partly cut-away side elevation view of the hedge trimmer and its mounting apparatus of FIG. 1.

As shown in FIG. 4, releasable securing means 24 is provided for releasably securing trimmer 22 to the mounting means 20. Securing means 24 comprises a generally U-shaped strap member 118 which extends through apertures (not shown) formed in mounting member 48 and has screw-threaded ends engaged by nuts 120. The strap member 118 extends over the handle 122 of trimmer 20 and serves to secure same to the mounting means. The releasable securing means further comprises one or more bolts 124 extending through apertures formed in mounting member 48 and screw threadedly engaging corresponding sockets formed in trimmer 22, the latter sockets being provided for mounting a handle, guard or like accessory on the trimmer.

The releasable securing means includes a switch actuation member 126 adjustably mounted on strap member 118 to engage a trigger switch 128 of trimmer 22 and to hold same in its on position. Nuts on strap member 118 provide for position-adjustment of the switch actuation member.

Use of the apparatus will now be described. The apparatus is set up in the condition shown in FIG. 1, in the manner described above or implicit therefrom. Trimmer 22 is electrically connected to a mains supply through switch 38. The trimmer 22 is set at the desired attitude for trimming the sides, top or intermediate portion of the hedge. Couplings 32, 34 are connected to the user's harness by means of quick attach spring connectors whereby the downwardly-acting weight of the apparatus is supported on the user's body. By grasping the side arms 26, 28 the user can easily swing the apparatus and guide its cutting action. Adjustment of the cutting attitude is easily accomplished by means of the wing nuts 108 and the adjustment bolts 110, 112. Moreover, length adjustment of the frame 14 is quickly and easily achieved by means of the adjuster members 40, 42 which are merely slackened and then re-tightened after length adjustment. The user energises the trimmer 22 by finger actuation of switch lever 44. Initial actuation of lever 44 requires a two-handed action including simultaneous pressing of button 46. When lever 44 is released it cannot be re-actuated without also pressing simultaneously button 46. This is a safety feature to ensure the cutter bar is only energised by deliberate action of the user. In use the underside surface of adjustment member 48 provides a hedge-contacting surface which serves to support at least part of the weight of the apparatus when cutting top and side surfaces of a hedge.

Among the advantages provided by the embodiment described above are the following. Firstly, the apparatus provides in a simple and cost effective manner means for permitting a conventional trimmer or the like to be used for relatively high level trimming operations. The equipment permits existing trimming apparatus to be employed without requiring the user to purchase specially constructed trimming apparatus. Moreover, the cutting apparatus does not require modification. Thus manufacturers' warranties are unaffected. The equipment is readily adapted to a wide variety of manufacturers' equipment. Holes can be provided in the base and sides of mounting member 48 to receive strap-type securing members and/or mounting bolts to engage screw threaded sockets provided in the trimming apparatus for handles or guards. No spanners are required for position adjustment of the apparatus. Safety of operation in trimming high hedges is greatly improved. The user can remain securely standing on firm ground while trimming the top portion of a hedge, whereby the danger arising from the use of ladders is avoided. Moreover, the electricity supply lead is kept well away from the cutter bar.

Among modifications which could be made in the above embodiment while remaining within the scope of the invention are the following. Detailed modifications to the support arm means can be readily envisaged including alternative means for length adjustment thereof. As regards the cutting means, alternatives include other powerhand tool cutting means. The apparatus permits relatively quick interchange between alternative power tools. For ease of manufacture, the strap means for securing the power tool in position may be supplied in the form of a light metal strip adapted to be bent by the user to conform to the form and dimensions of his own trimmer or the like. Means may be provided for absorbing vibration produced by the cutting means, for example resilient mountings may be provided through which the cutting means is connected to the mounting member 48. Of course, the invention is equally applicable to battery-powered cutters as to mainspowered ones. Earth leakage circuit breakers and the like may be employed with the latter. Where the support arms are required to be particularly long, means may be provided for reducing the bending moment. For example, where the support arms have three or more extensible sections at each side, winch and ratchet means may be provided to reduce the bending moment supplied to the apparatus in a simple and cost effective manner.

I claim:

1. Mounting apparatus (10) for use with hedge and the like cutting apparatus (12), said mounting apparatus comprising:
   support arm means (14) adapted to be carried by a user to support drivable cutting means (16) at one end (18) thereof;
   said cutting means (16) being angularly adjustable (A) with respect to said support arm means (14);
   mounting means (20) at said one end (18) of said support arm means to receive and support an electrically or otherwise powered hand tool (22) providing said cutting means (16);
   said mounting means (20) providing said angular adjustment (A) of said cutting means with respect to said support arm means (14) to vary the angle of cut;
   releasable securing means (24) for releasably securing said hand tool (22) to said mounting means (20) whereby said hand tool may be detached for subsequent direct hand operation by a user;
   said support arm means further comprising frame means having a pair of widely spaced frame side members extending lengthwise of the frame, one frame side member at each side thereof, and at least one frame cross-member connected between and linking said side members in a spaced apart relationship;
   said frame means having said mounting means at its outer end to receive and support said hand tool and having in the region of its inner end a pair of spaced apart connectors for detachable connection to a user's body harness, one of said connectors being located in the region of each side of the frame at said inner end thereof, and said frame side members being spaced apart by a distance substantially greater than the width of said mounting means for said hand tool whereby said frame side members can be conveniently grasped between the inner and outer ends of said frame means by the user during use, and said frame means can thus be held in an upward inclination while the weight of the apparatus and tool is substantially supported by said harness;
   the spacial relationship of said frame with respect to said mounting means being such that said mounting means can receive and mount said cutting means so that the cutting means can cut in a lateral direction which is generally the same direction as the direction in which said frame side members are spaced apart, whereby said spaced apart frame members grasped by the user permit effective control of cutter movement in said lateral cutting direction, and
   control means for controlling the operation of said hand tool being mounted on said frame within finger reach of one of said user's hands when grasping said frame side members.

2. Mounting apparatus (10) for use with hedge and the like cutting apparatus (12) comprising:
   support arm means (14) adapted to be carried by a user to support drivable cutting means (16) at one end (18) thereof;
   said cutting means (16) being angularly adjustable (A) with respect to said support arm means (14);
   mounting means (20) at said one end (18) of said support arm means to receive and support an electrically or otherwise powered hand tool (22) providing said cutting means (16);
   said mounting means (20) providing said angular adjustment (A) of said cutting means with respect to said support arm means (14) to vary the angle of cut;
   releasable securing means (24) for releasably securing said hand tool (22) to said mounting means (20) whereby said hand tool may be detached for subsequent direct hand operation by a user;
   on/off switch means (38) mounted on said support arm means to control said hand tool (22) said switch means being biased to its off condition and having a switch actuator element (44) positioned for finger control by a user holding said support arm means (14), and
   said switch means (38) including lock means to lock said switch actuator (44) in its off condition, said lock means being releasable by a release element (46) separate from said switch actuator element (44) whereby actuation of said switch (38) to its on condition by said switch actuator element (44)

requires also simultaneous actuation of said release element (46).

3. The mounting apparatus of claim 1 characterized by said control means for controlling the operation of said hand tool being biased to the power off condition of said hand tool and having an actuator element positoned for said finger control by a user grasping said support frame, said control means also including lock means to lock said actuator in the off condition of said hand tool, said lock means being releasable by a release element separate from said actuator element whereby actuation of said control means to the on condition of said hand tool by said actuator element requires also simultaneous actuation of said release element.

4. Mounting apparatus for use with hedge and the like cutting means comprising:
support arm means adapted to be carried by a user to support drivable cutting means at one end thereof;
said cutting means being angularly adjustable with respect to said support arm means;
mounting means at said one end of said support arm means to receive and support a hand tool providing said cutting means;
said mounting means providing said angular adjustment of said cutting means with respect to said support arm means to vary the angle of cut; and
releasable securing means for releasably securing said hand tool to said mounting means whereby said hand tool may be detached for subsequent direct hand operation by a user;
said support arm means further comprising frame means having a pair of widely spaced frame side members extending lengthwise of the frame, one frame side member at each side thereof, and at least one frame cross-member connected between and linking said side members in a spaced apart relationship;
said frame means having said mounting means at its outer end to receive and support said hand tool and having in the region of its inner end a pair of spaced apart connectors for detachable connection to a user's body harness, one of said connectors being located in the region of each side of the frame at said inner end thereof, and said frame side members being spaced apart by a distance substantially greater than the width of said mounting means for said hand tool whereby said frame side members can be conveniently grasped between the inner and outer ends of said frame means by the user during use, and said frame means can thus be held in an upward inclination while the weight of the apparatus and tool is substantially supported by said harness;
the spacial relationship of said frame with respect to said mounting means being such that said mounting means can receive and mount said cutting means so that the cutting means can cut in a lateral direction which is generally the same direction as the direction in which said frame side members are spaced apart, whereby said spaced apart frame members grasped by the user permit effective control of cutter movement in said lateral cutting direction;
control means for controlling the operation of said hand tool being mounted on said frame within finger reach of one of said user's hands when grasping said frame side members;
each of said frame side members further comprising two telescoping portions whereby said frame is telescopically length adjustable, and
said mounting means further comprises a generally channel section mounting member within which the main body of said hand tool is secured in use, said mounting member being pivotally connected to said frame means about a pivot axis extending generally laterally with respect to the lengthwise extent of said frame side members and generally parallel to the plane containing said frame side members.

5. The mounting apparatus of claim 4 characterized in that said base portion of said channel section mounting member provides a hedge-contacting surface in use which shields substantially the entire main body of said hand tool and can form a support of the hand tool where by a proportion of the weight thereof is supported by the hedge through said hedge-contacting surface.

6. The mounting apparatus of claim 1 characterized in that said releasable securing means for releasable securing said hand tool to said mounting means comprises threaded fastener means engageable with complementary threaded fastener means provided on said hand tool for securing a handle or guard or the like to said hand tool.

7. The mounting apparatus of claim 1 characterized in that the inner end of said frame means is adapted to rest against the user's body by engagement of said frame cross-member, or another frame cross-member, therewith.

* * * * *